United States Patent [19]
Caburet et al.

[11] Patent Number: 5,576,068
[45] Date of Patent: Nov. 19, 1996

[54] METHOD OF TREATING A PACKAGING ELEMENT, ESPECIALLY FOR MEDICAL OR PHARMACEUTICAL USE; PACKAGING ELEMENT THUS TREATED

[75] Inventors: Laurent Caburet, La Garenne Colombes; Kamyar Asfardjani, Lille; Odile Dessaux, Lille; Pierre Goudmand, Lille; Charaffedine Jama, Lille, all of France

[73] Assignee: Societe De Transformation Des Elastomers A Usages Medicaux Et Industriels, La Courneuve, France

[21] Appl. No.: 498,052

[22] Filed: Jul. 5, 1995

[30] Foreign Application Priority Data

May 4, 1995 [FR] France ................. 95 05333

[51] Int. Cl.⁶ ............... C23C 4/04; B32B 15/04
[52] U.S. Cl. ............... 427/452; 428/447; 428/451
[58] Field of Search ............ 427/452; 428/447, 428/451

[56] References Cited

U.S. PATENT DOCUMENTS 5,439,736  8/1995  Nomura ................. 428/308.4

*Primary Examiner*—W. Robinson H. Clark
*Attorney, Agent, or Firm*—Dennison, Meserole, Pollack & Scheiner

[57] ABSTRACT

The present invention relates to a method of treating a packaging element, especially a sealing element, comprising the coating with a polymer film of at least those parts of said element which are liable to be in contact with the products packaged, wherein said coating is produced by polymerization, assisted by cold-far-remote-plasma, of at least one monomer chosen from siloxanes and silazanes of formula:

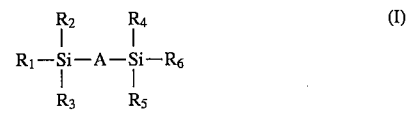

in which:
A represents an oxygen atom or the NH group and;
$R_1$, $R_2$, $R_3$, $R_4$, $R_5$ and $R_6$ represent, independently, a hydrogen atom or an alkyl or alkoxy group having from 1 to 4 carbon atoms, preferably a methyl group. Application: stoppers intended for a medical or pharmaceutical use.

13 Claims, 1 Drawing Sheet

METHOD OF TREATING A PACKAGING ELEMENT, ESPECIALLY FOR MEDICAL OR PHARMACEUTICAL USE; PACKAGING ELEMENT THUS TREATED

The present invention relates in general to a method of treating a packaging element, especially for medical or pharmaceutical use, and the packaging element thus treated.

More precisely, the object of this method is to provide a packaging element whose characteristics make it possible to prevent any contamination of the products packaged by limiting container/contents exchange while at the same time allowing easy use on an industrial scale.

For reasons of clarity, the description which follows will be given more particularly with reference to a sealing element for medical or pharmaceutical use, but the general principle of the invention applies to any element for packaging products intended to be preserved from any contamination.

It is known that pharmaceutical products must be packaged so that they can remain sterile and protected from the external environment.

Despite the great care with which they are manufactured, the packaging elements used up to now in the pharmaceutical industry are not completely inert with respect to the products packaged.

Thus, in particular, packaging elements, at least one part of which is made of elastomer, tend to contaminate the packaged products with which they are in contact by the salting out (or teaching) of certain residues coming from their manufacturing process, and especially metal ions or heavy metals contained in the fillers generally associated with these elastomers.

Moreover, these packaging elements tend to stick together during storage or while they are being sterilized, so that it is necessary on an industrial scale to lubricate these elements, which leads to the generation of undesirable lubricant particles and increases the aforementioned contamination problems.

In order to alleviate these drawbacks, many solutions have been proposed, without any proving to be completely satisfactory on an industrial scale.

In common with all these solutions, it is proposed to coat the surface of at least those parts of the said packaging element liable to be in contact with the products packaged with a layer or film of polymer providing a "barrier" effect, that is to say limiting container/contents exchange, and/or having a low coefficient of friction as well as antiblocking properties compatible with the industrial constraints of existing automated packaging lines.

Thus, in documents JP-84-19464 and JP-84-218830, it has been proposed to subject the elastomeric packaging elements to an atmosphere of gaseous fluorine.

This technique makes it possible to decrease the coefficient of friction of the packaging element satisfactorily but does not prevent the migration of impurities arising from the latter into the products packaged.

In document EP-296,878, it has been proposed to coat the packaging element by means of a modified poly-siloxane using a two-step method consisting in applying said polymer to the surface of the packaging element and then in binding it to this surface either by heating or by irradiation.

The use of a solvent is recommended in order to allow the polymer to be applied to the packaging element easily.

However, the method described in this prior document does not make it possible to satisfactorily prevent migration of the impurities coming from the elastomeric packaging element into the products packaged.

Furthermore, the reactive groups of the modified polysiloxane which are intended to enable it to bond onto said packaging element have a non-negligible toxicity.

Finally, due to the affinity of the elastomers for certain solvents, there is a risk of the elastomer swelling with the uncertainty of being able to completely remove the solvent before the elastomeric element is used.

The two methods which have just been described moreover rely for their implementation on specific and expensive installations, especially by reason of the relative toxicity of some of the products used, which understand-ably constitutes a serious obstacle to the exploitation of these methods on an industrial scale.

In document WO-88/08012, the use of a coating based on polyparaxylylene is recommended for elastomeric sealing elements for pharmaceutical use.

This coating has a relatively low coefficient of friction, less than 0.5, and very good antiblocking properties.

However, the intrinsic surface properties of this coating lead to a loss of sealing in the zone of the area of contact between the elastomeric sealing element thus coated and the rigid part of the container (generally made of glass, plastic or metal).

This loss of sealing constitutes a major drawback in the case of the packaging of freeze-dried products, the transmission of oxygen or of water vapor resulting therefrom being liable to destabilize the preparation intended to be packaged.

Under these conditions, the object of the present invention is to solve the technical problem consisting of the provision of a method of treating a packaging element, especially a sealing element, intended in particular for a medical or pharmaceutical use, by coating by means of a polymer film allowing a packaging element to be obtained which has the same properties as the same, but uncoated element with, furthermore, the additional properties provided by the coating, in particular "barrier" properties allowing exchange between the products packaged and the packaging element to be prevented and allowing antiblocking and slip properties as defined previously.

Among the properties of an uncoated packaging element that it is desired to preserve within the scope of the present invention, mention may be made in particular of:

excellent impermeability to gases and to germs present in the external environment;

excellent sealing in contact with glass, plastic or metal;

ease of piercing by a trocar or a hypodermic needle;

ability to self-seal after having been pierced several times by a trocar or a hypodermic needle;

no generation of fragments whilst being pierced by a trocar or a hypodermic needle;

ability to be sterilized using steam, dry heat, ethylene oxide or ionizing radiation.

It has been discovered, and this constitutes the basis of the present invention, that it was possible to solve the aforementioned technical problem completely satisfactorily:

on the one hand, by using a particular coating method consisting of cold far remote plasma assisted polymerization and;

on the other hand, by choosing for this polymerization certain particular polymers of the siloxane or silazane family.

The use of a flowing cold plasma is a known technique for the surface treatment of various articles.

Document FR-2,616,088 describes, for example, the use of this technique for treating the surface of a polypropylene article intended to be coated with an epoxy resin.

Document WO-92/03591 describes the use of this technique for the surface treatment of textile fibers so as to confer on the latter antisoiling and nonwetting properties.

Document FR-2,701,492 describes the use of this technique for producing thin uniform layers adhering to the surface of various substrates in the production of electronic or microelectronic devices.

However, it is important to note that the technique of cold-far-remote-plasma-assisted polymerization has never been recommended for decreasing the coefficient of friction of articles made especially of elastomer.

Furthermore, the state of the art does not suggest the particular use of siloxane or silazane monomers used within the scope of the present invention.

Thus, according to a first aspect, the subject of the present invention is a method of treating a packaging element, especially a sealing element, intended in particular for a medical or pharmaceutical use, comprising the coating with a polymer film of at least those parts of said element which are liable to be in contact with the products packaged, wherein said coating is produced by cold-far-remote-plasma-assisted polymerization, of at least one monomer chosen from siloxanes and silazanes of formula:

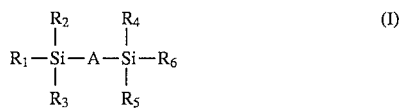

in which:

A represents an oxygen atom or the NH group and;

$R_1$, $R_2$, $R_3$, $R_4$, $R_5$ and $R_6$ represent, independently, a hydrogen atom or an alkyl or alkoxy group having from 1 to 4 carbon atoms, preferably a methyl group.

In general, the person skilled in the art will be able to refer to the aforementioned documents incorporated herein for reference, and especially to document FR-2,701,492 for a detailed description of treatment by cold far remote plasma, also called delayed cold plasma.

Essentially, a cold far remote plasma is obtained by extracting the excited atomic or ionic species from a plasma after expansion, in dynamic mode, out of the microwave discharge zone in which said plasma was formed.

The method in accordance with the present invention will essentially apply to elastomeric or thermoplastic packaging elements.

These elastomers may be of any, synthetic, natural or thermoplastic, type and may or may not include a crosslinked phase.

They may, for example, be natural rubber, or isobutylene and isoprene copolymers such as butyl rubber, these possibly being halogenated, the latter generally being preferred because of their low gas and water-vapor permeability.

The method in accordance with the present invention applies most particularly to sealing elements for medical or pharmaceutical use, like, in particular, bottle stoppers, disks or washers, syringe plunger tips or else syringe-needle protection devices.

Of course, this method may also apply in general to any packaging element for which it would be necessary to reduce the coefficient of friction and to prevent container/contents exchange.

Advantageously, the monomer used within the scope of the method in accordance with the invention is tetra-methyldisiloxane of formula:

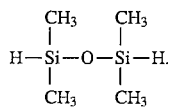

This monomer has led to the best results, but other monomers of formula (I) may also be suitable within the scope of the present invention, and mention may be made in particular in this regard to monomers of the alkoxysilane type, for example trimethoxysilane or tetramethoxysilane; monomers of the silazane type, for example tetramethyldisilazane or hexamethyldisilazane; monomers of the siloxane type, for example hexamethyldisiloxane.

According to a particular characteristic of the method in accordance with the present invention, the cold-far-remote-plasma is a nitrogen plasma. The reason for this is that nitrogen has a remarkable inertia and its cost is sufficiently low for it to be compatible with industrial use.

However, other plasma-forming gases may possibly be used, like for example argon, xenon, nitric oxide or oxygen.

Possibly, the plasma-generating gas may be doped with an agent such as $NF_3$, $CF_4$, halogen gases or $NH_3$.

It has been observed, and this constitutes a novel characteristic of the method of the invention, that the "barrier" effect of the polymer film applied to the packaging element may be improved by the use of gaseous oxygen as a polymerization cofactor.

The gaseous oxygen may be introduced by injection either upstream of the injection of the monomer or simultaneously with it.

Advantageously, oxygen is used in an amount by volume lying between 0% and 50%, preferably between 0 and 20%, of the volume of the plasma-generating gas used for forming the aforementioned plasma.

In general, the thickness of the polymer film lies between 100 Å and a few microns, preferably between 100 and 10,000 Å, and essentially depends on the duration of the treatment.

This relatively small thickness is compatible with the dimensional tolerances acceptable for such packaging elements and therefore makes it possible to use the same tooling, especially the same molds as for the production of elements not intended to be coated.

In general, the polymer film may be deposited solely on those parts of the packaging element which are liable to be in contact with the products packaged.

Advantageously, especially in the case of sealing elements, this film will be deposited over the entire surface of said packaging element.

According to a second aspect, the present application aims to cover a packaging element, especially a sealing element for medical or pharmaceutical use, capable of being obtained using the method which has just been described.

The invention will be better understood and other features and advantages of it will be more apparent on reading the following explanatory description, given with reference to the single appended figure which illustrates diagrammatically an installation allowing implementation of the present method.

BRIEF DESCRIPTION OF DRAWING

In this single FIGURE, the reference number (1) represents a pipe for inflow of plasma-generating gas, the reference number (2) represents the discharge zone allowing the plasma to form, the reference number (3) represents a reactor in which the polymerization takes place, this reactor being connected to a source (4) supplying monomer(s) and possibly to a source (5) supplying oxygen, as well as a vacuum pump generally represented by the reference number (6).

BRIEF DESCRIPTION

Figure 1:
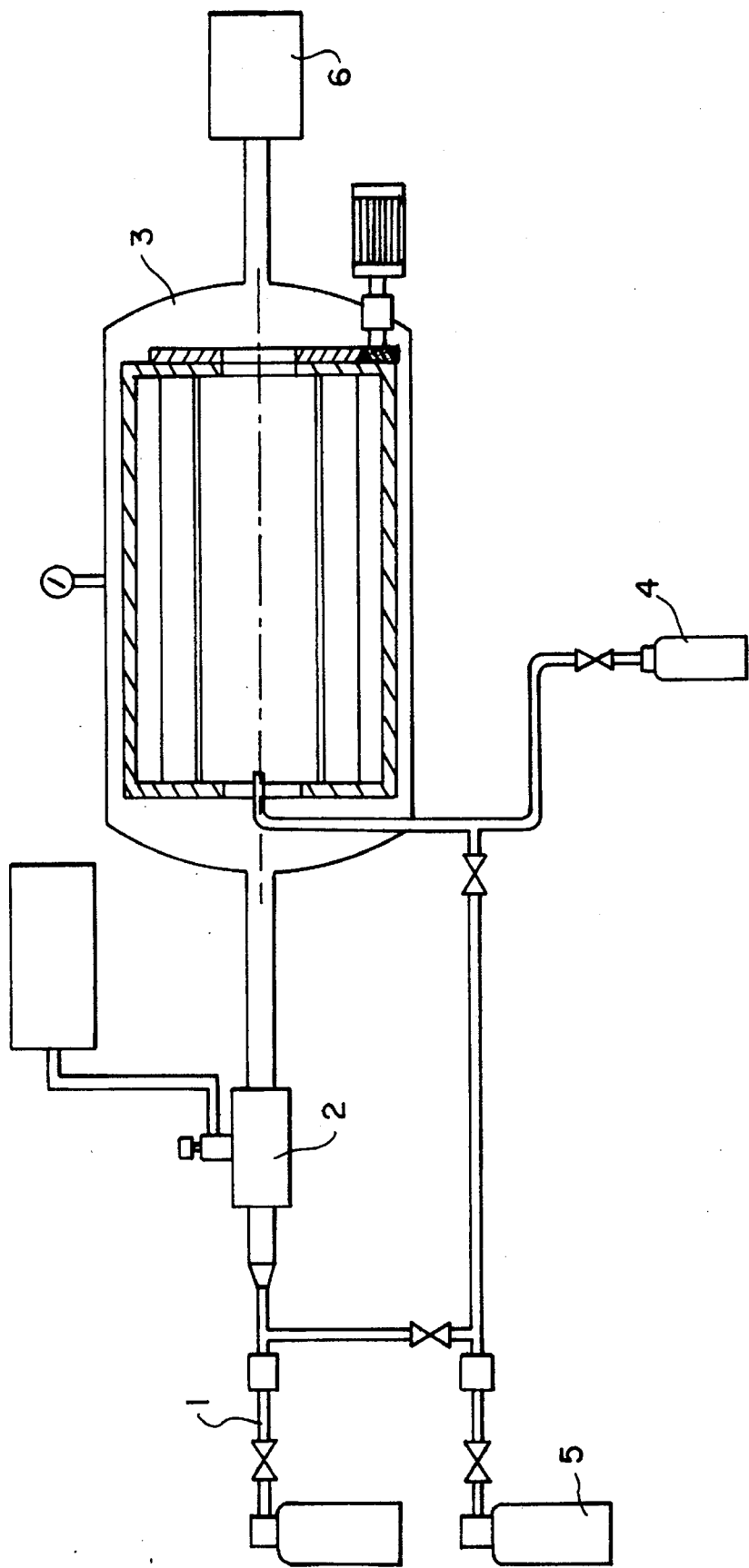

The operation of this installation follows:

The plasma-generating gas is introduced into the discharge zone (2).

In a manner known per se, the plasma is obtained by passing the plasma-generating gas into a glass tube which is itself connected to a microwave resonant cavity via a device called a coupling device. A discharge is produced by transfer of energy from the microwave generator to the plasma-generating gas.

The excited species are extracted from the discharge zone by the vacuum pump (6) and reach the reactor (3) where the polymerization takes place.

In the case of nitrogen, the origin of the reactivity of the gas is atoms in a $N(^4S)$ ground state and excited nitrogen molecules.

Only particles having a sufficiently long "lifetime" manage to reach the reactor, so that the reactive medium at this place does not contain ions or electrons in appreciable quantity.

Introduced into the reactor (3), also called post-discharge zone, are the components to be treated, at least one monomer and possibly an oxygen gas flow.

The uniformity of treatment of the components is improved by regular stirring, obtained by continuous or sequenced rotation, in the reactor, generally obtained with a drum into which the components to be treated are inserted, the inside of the drum possibly being equipped with blades so as to optimize the movement of the components in the radial and axial directions of said drum.

Furthermore, the uniformity of the deposition is promoted by the flow of the cold gas plasma towards the exit of the treatment chamber where the vacuum pump (6) is connected.

If the monomer is in the liquid state under standard temperature and pressure conditions, it is necessary, of course, to heat it, for example in an evaporator surrounded by a heating cord regulated by a rheostat.

The various parameters making it possible to define the characteristics of the deposition produced, namely the type and flow rate of the plasma-generating and doping gases, the power of the microwave generator, the type and flow rate of the monomer or oligomer, and the treatment time, may easily be determined by the person skilled in the art so as to obtain the compromise of properties required.

Among these parameters, it may be pointed out that the frequency of the microwave generator will be adjusted to a value compatible with those frequencies allowed industrially (preferably 433,915 or 2450 MHz) and the pressure inside the device will generally lie between 3 and 20 hPa.

The rate of deposition of the polymer film essentially depends on the oxygen content and the monomer content, and will preferably be of the order of 1 to 10 Å/s.

The thicknesses thus obtained will be of the order of a few angstroms to a few microns depending on the desired characteristics for the packaging element to be treated.

It should be noted that the deposition thus produced has a uniform thickness since the monomer is applied in gaseous form, thereby allowing surface-tension problems inherent in liquids to be overcome.

Detailed Example of Implementation of the Method in Accordance with the Invention Elastomeric stoppers for pharmaceutical use were treated in the installation described in FIG. 1, using a 2450 MHz microwave generator at a power of 800 watts.

In this example, nitrogen was used as plasma-generating gas and tetramethyldisiloxane as monomer.

The stoppers were subjected to a coating using cold-far-remote-plasma-assisted polymerization for a period of approximately 10 minutes, the monomer and nitrogen flow rates (referred to standard temperature and pressure conditions) being respectively 100 cm$^3$/min and 8 l/min.

A uniform film of polymerized tetramethyl-disiloxane is thus obtained with a thickness of approximately 800 angstroms.

The stoppers thus treated have a coefficient of friction on polished stainless steel of less than 0.35 and guarantee satisfactory impermeability after insertion into the neck of a bottle of suitable size.

Tests, the results of which are not reported here, have demonstrated that these stoppers exhibit remarkable chemical inertness on contact with a pharma-ceutical compound, limiting the migration of undesirable species.

In particular, it has been shown that the quantity of zinc ions extracted after autoclaving in distilled water may be divided by a factor of 5 by virtue of the implementation of the method in accordance with the invention.

Furthermore, these stoppers proved to be particularly suitable during passage in an automated line for packaging pharmaceutical products, without adding a lubricant.

Furthermore, the stoppers treated by the method in accordance with the invention preserved the initial properties they had before coating.

The method which has just been described has very many advantages.

In addition to those mentioned previously, the fact may also be emphasized that this method allows packaging elements to be coated without prior preparation of their surface finish and allows the deposition of polymer to take place in the absence of solvent or of dangerous or toxic substances.

It should be further noted that the deposition obtained starting from a monomer of the siloxane type makes it possible to obtain a transparent coating which is advantageous from an esthetic standpoint.

Since the deposition takes place at room temperature, it is also important to note the absence of any risk of thermal degradation of the packaging element.

Furthermore, the packaging elements treated by this method meet all the tests in the pharmacopeias and especially those of the European Pharmacopeia.

Furthermore, this method is inexpensive in terms of energy and of raw materials, and has no impact on the environment.

What is claimed is:

1. A method of treating a packaging element, comprising the coating with a polymer film of at least a portion of said element, wherein said coating is produced by cold-far-remote-plasma-assisted polymerization of at least one monomer in gaseous form selected from the group consisting of siloxanes and silazanes of formula:

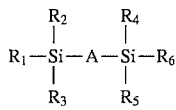 (I)

in which:

A represents an oxygen atom or the NH group and;

$R_1$, $R_2$, $R_3$, $R_4$, $R_5$ and $R_6$ represent, independently, a hydrogen atom or an alkyl or alkoxy group having from 1 to 4 carbon atoms.

2. The method as claimed in claim 1, wherein said portion of the packaging element is made of a material selected from an elastomer and a thermoplastic.

3. The method as claimed in claim 1, wherein the packaging element is a sealing element.

4. The method as claimed in claim 1, wherein the packaging element is selected from the group consisting of a bottle stopper, a disk, a washer, a syringe plunger tip, a needle and syringe protection device.

5. The method as claimed in claim 1, wherein the plasma is a nitrogen plasma.

6. The method as claimed in claim 1, wherein the polymerization is carried out in the presence of gaseous oxygen as a polymerization cofactor.

7. The method as claimed in claim 6, wherein oxygen is used in an amount by volume lying between 0% and 50%, of the volume of a plasma-generating gas used to form the plasma.

8. The method as claimed in claim 1, wherein the polymer film has a thickness lying between 100 Å and a few microns.

9. The method as claimed in claim 8, wherein the polymer film has a thickness lying between 100 and 10,000 Å.

10. A method of treating a packaging element comprising coating at least a portion thereof with a polymer film, said coating being produced by cold-far-remote-plasma assisted polymerization of tetramethyldisiloxane in gaseous form.

11. A method of treating a packaging element comprising:

a) introducing the packaging element into a polymerization chamber;

b) introducing into the polymerization chamber at least one monomer in gaseous form selected from the group consisting of siloxanes and silazines of formula:

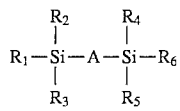

wherein A is an oxygen atom or NH group; and $R_1$, $R_2$, $R_3$, $R_4$, $R_5$ and $R_6$ are, independently, a hydrogen atom or an alkyl or alkoxy group having from 1 to 4 carbon atoms;

c) introducing a plasma generating gas into a discharge zone remote from the polymerization chamber and transferring energy to the plasma generating gas to cause the formation of excited species;

d) passing said excited species into the polymerization chamber to cause said monomer to polymerize and deposit a polymer film on said packaging element; and e) removing said packaging element with polymer film thereon from said polymerization chamber.

12. A packaging element having a polymer film coating on at least a portion thereof, said coating being produced by cold-far-remote-plasma assisted polymerization of at least one monomer in gaseous form selected from the group consisting of siloxanes and silazines of formula:

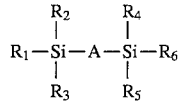

wherein A is an oxygen atom or NH group; and $R_1$, $R_2$, $R_3$, $R_4$, $R_5$ and $R_6$ are, independently, a hydrogen atom or an alkyl or alkoxy group having from 1 to 4 carbon atoms.

13. A packaging element, as claimed in claim 12, which is a sealing element.

* * * * *